United States Patent
Venkataramani et al.

(10) Patent No.: US 11,556,450 B2
(45) Date of Patent: Jan. 17, 2023

(54) HYBRID DATA-MODEL PARALLELISM FOR EFFICIENT DEEP LEARNING

(71) Applicant: International Business Machines Corporation, Armonk, NY (US)

(72) Inventors: Swagath Venkataramani, Yonkers, NY (US); Vijayalakshmi Srinivasan, New York, NY (US); Philip Heidelberger, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 16/599,189

(22) Filed: Oct. 11, 2019

(65) Prior Publication Data

US 2021/0110247 A1 Apr. 15, 2021

(51) Int. Cl.
*G06F 11/34* (2006.01)
*G06F 9/50* (2006.01)

(52) U.S. Cl.
CPC ........ *G06F 11/3466* (2013.01); *G06F 9/5066* (2013.01)

(58) Field of Classification Search
CPC . G06F 11/3466; G06F 9/5066; G06N 3/0445; G06N 3/0454
See application file for complete search history.

(56) References Cited

U.S. PATENT DOCUMENTS 7,747,070 B2 6/2010 Puri
9,508,347 B2 11/2016 Wang et al.
(Continued)

FOREIGN PATENT DOCUMENTS

CN 108647773 A 10/2018
CN 110163338 A 8/2019
(Continued)

OTHER PUBLICATIONS

Zhaoya Gong, Wenwu Tang, and Jean-Claude Thill, "Parallelization of ensemble neural networks for spatial land-use modeling," Proceedings of the 5th ACM SIGSPATIAL International Workshop on Location-Based Social Networks (LBSN '12). ACM, New York, NY, USA, 48-54.

(Continued)

*Primary Examiner* — Benjamin C Wu
(74) *Attorney, Agent, or Firm* — Patterson + Sheridan, LLP

(57) ABSTRACT

The embodiments herein describe hybrid parallelism techniques where a mix of data and model parallelism techniques are used to split the workload of a layer across an array of processors. When configuring the array, the bandwidth of the processors in one direction may be greater than the bandwidth in the other direction. Each layer is characterized according to whether they are more feature heavy or weight heavy. Depending on this characterization, the workload of an NN layer can be assigned to the array using a hybrid parallelism technique rather than using solely the data parallelism technique or solely the model parallelism technique. For example, if an NN layer is more weight heavy than feature heavy, data parallelism is used in the direction with the greater bandwidth (to minimize the negative impact of weight reduction) while model parallelism is used in the direction with the smaller bandwidth.

19 Claims, 7 Drawing Sheets

(56) References Cited

U.S. PATENT DOCUMENTS

| | | | |
|---|---|---|---|
| 9,747,548 B2* | 8/2017 | Ross | G06N 3/063 |
| 10,540,587 B2* | 1/2020 | Krizhevsky | G06V 10/454 |
| 11,093,817 B2* | 8/2021 | Tanabe | G06N 3/0454 |
| 11,094,029 B2* | 8/2021 | Kalamkar | G06T 1/20 |
| 2015/0294219 A1 | 10/2015 | Krizhevsky | |
| 2016/0379115 A1* | 12/2016 | Burger | G06F 15/7803 706/25 |
| 2018/0293492 A1* | 10/2018 | Kalamkar | G06N 3/0454 |
| 2018/0293493 A1* | 10/2018 | Kalamkar | G06N 3/0445 |
| 2018/0314940 A1* | 11/2018 | Kundu | G06N 3/0454 |
| 2018/0322606 A1* | 11/2018 | Das | G06T 1/60 |
| 2019/0080232 A1 | 3/2019 | Choi et al. | |
| 2019/0164035 A1* | 5/2019 | Kwon | G06N 3/04 |
| 2019/0205745 A1* | 7/2019 | Sridharan | G06N 3/08 |
| 2020/0019836 A1* | 1/2020 | Arthur | G06N 3/063 |
| 2020/0050939 A1* | 2/2020 | Zhu | G06N 20/00 |
| 2020/0159809 A1* | 5/2020 | Catthoor | G06N 3/063 |
| 2021/0287076 A1* | 9/2021 | Li | G06N 3/063 |

FOREIGN PATENT DOCUMENTS

| | | |
|---|---|---|
| EP | 3367310 A1 | 8/2018 |
| WO | 2019165946 A1 | 9/2019 |

OTHER PUBLICATIONS

Jinrong Guo, Wantao Liu, Wang Wang, Qu Lu, Songlin Hu, Jizhong Han, and Ruixuan Li, "A GPU memory efficient speed-up scheme for training ultra-deep neural networks," Proceedings of the 24th Symposium on Principles and Practice of Parallel Programming (PPoPP '19). ACM, New York, NY, USA, 397-398.

Soojeong Kim, Gyeong-In Yu, Hojin Park, Sungwoo Cho, Eunji Jeong, Hyeonmin Ha, Sanha Lee, Joo Seong Jeong, and Byung-Gon Chun, "Parallax: Sparsity-aware Data Parallel Training of Deep Neural Networks," Proceedings of the Fourteenth EuroSys Conference 2019 (EuroSys '19). ACM, New York, NY, USA, Article 43, 15 pages.

Alex Krizhevsky, "One Weird Trick For Parallelizing Convolutional Neural Networks," arXiv:1404 5997v2 [cs NE] Apr. 26, 2014, 7 pages.

Linghao Song, Jiachen Mao, Youwei Zhuo, Xuehai Qian, Hai Li, Yiran Chen, "HyPar: Towards Hybrid Parallelism for Deep Learning Accelerator Array," Duke University, University of Southern California, HPCA, 2019, 13 pages.

PCT Notification of Transmittal of the International Search Report and the Written Opinion of the International Searching Authority, or the Declaration for Application PCT/IB2020/059113 dated Jan. 15, 2021.

* cited by examiner

|  |  |
|---|---|
| All-Data $ChipD_{out} = N_{out}$ $ChipD_{MB} = N_{MB}/MN$ | ModelXDataY $ChipD_{out} = N_{out}/M$ $ChipD_{MB} = N_{MB}/N$ |
| DataXModelY $ChipD_{out} = N_{out}/N$ $ChipD_{MB} = N_{MB}/M$ | All-Model $ChipD_{out} = N_{out}/MN$ $ChipD_{MB} = N_{MB}$ |

MATRIX 700

*Parallelism in X-dir.*

*Parallelism in Y-dir.*

HYBRID DATA-MODEL PARALLELISM FOR EFFICIENT DEEP LEARNING

BACKGROUND

The present invention relates to using hybrid parallelism techniques for assigning layers in a neural network to an array of processors.

Training a neural network (NN) is a time consuming process. As a result, many training platforms use an array of processors (e.g., a 2D torus) to divide the workload of each layer of the NN. There are several known techniques for dividing workload among a plurality of processors. One such technique is data parallelism where workload is split by the features (or inputs) of the layers. In this technique, each processor can perform all the tasks for a particular batch (or minibatch) of training data. Using an image processor NN as an example, each processor may be assigned to process a respective image. To do so, the weights (or kernels) for that layer must be transmitted to each of the processors. In NN layers where the weights are larger than the features (referred to herein as weight heavy layers), using the data parallelism technique is inefficient because of weight reduction between the chips where at the end of each batch or minibatch training the weights are synchronized. This is a costly chip-to-chip operation and is often the main pain point with data parallelism.

Another technique is model parallelism where the workload for a layer is split in the output dimension. That is, the first several features are computed in one processor, the next several features are computed in another processor, and so forth. Doing so avoids having to send all the weights of the layer to each processor, and thus, avoids weight reduction. However, typically in a NN, every output feature requires the entire input channel. That is, to compute a few features, each processor still needs the whole input of the layer (e.g., the output from the previous layer). Using model parallelism, the input is replicated (referred to as performing "activations") in all the processors. Before the next layer in the NN can begin, each processor needs to receive the output calculated by every other chip—i.e., the activations of all the processors are communicated to each other. Thus, model parallelism is more efficient than data parallelism for weight heavy layers but less efficient for feature heavy layers (where the feature (or input) data is larger than the weight data).

SUMMARY

According to one embodiment of the present invention, is a method that includes selecting a hybrid parallelism technique for splitting a workload of a neural network layer to an array of processors, where each processor in the array of processors can transfer data to neighboring processors in a first direction and a second direction. The method also includes assigning tasks corresponding to the neural network layer to the array of processors using the selected hybrid parallelism technique where the hybrid parallelism technique includes using a first parallelism technique when transferring data between processors in the array of processors in the first direction and using a second, different parallelism technique when transferring data between processors in the array of processors in the second direction.

Another embodiment of the present invention is a system that includes an array of processors and a neural network assignor. The assignor is configured to select a hybrid parallelism technique for splitting a workload of a neural network layer to an array of processors where each processor in the array of processors can transfer data to neighboring processors in a first direction and a second direction and assign tasks corresponding to the neural network layer to the array of processors using the selected hybrid parallelism technique where the hybrid parallelism technique includes using a first parallelism technique when transferring data between processors in the array of processors in the first direction and using a second, different parallelism technique when transferring data between processors in the array of processors in the second direction.

Another embodiment of the present invention is computer readable storage medium having computer-readable program code embodied therewith, the computer-readable program code executable by one or more computer processors to perform an operation. The operation includes selecting a hybrid parallelism technique for splitting a workload of a neural network layer to an array of processors where each processor in the array of processors can transfer data to neighboring processors in a first direction and a second direction and assigning tasks corresponding to the neural network layer to the array of processors using the selected hybrid parallelism technique where the hybrid parallelism technique includes using a first parallelism technique when transferring data between processors in the array of processors in the first direction and using a second, different parallelism technique when transferring data between processors in the array of processors in the second direction.

DETAILED DESCRIPTION

Rather than being limited to either data parallelism or model parallelism, the embodiments herein introduce hybrid parallelism techniques where a mix of data and model parallelism can be used to split the workload of a layer across an array of processors (e.g., an array of integrated circuits (ICs) or chips). In one embodiment, the array of processors includes x-rings in a first (X) direction and y-rings in a second (Y) direction. When configuring the array, the bandwidth of the processors in one direction may be greater than the bandwidth in the other direction. That is, the system designer may intentionally assign more communication links for communicating between processors in the X direction than the Y direction. Each layer can then be characterized according to whether they are more feature heavy or weight heavy. Depending on this characterization, the workload of an NN layer can be assigned to the array using a hybrid parallelism technique rather than using solely the data parallelism technique or solely the model parallelism technique. For example, an NN layer may be slightly more weight heavy than feature heavy. Because model parallelism is more efficient at executing weight-heavy layers, the workload of the NN layer may be split using a first hybrid parallelism technique where data parallelism is used in the X direction (where bandwidth is greater) to realize gradient reduction along fast X-direction links and model parallelism is used in the Y direction (where bandwidth is lower but model parallelism is inherently more efficient for weight heavy layers). Conversely, if an NN layer is more feature heavy than weight heavy, the workload may be split using a second hybrid parallelism technique where model parallelism is used in the X direction to minimize the negative impact of feature activation while data parallelism is used in the Y direction since data parallelism is inherently more efficient for weight-heavy layers.

While the hybrid parallelism techniques can be used in an array of processors where the bandwidth in one direction is different from the bandwidth in the orthogonal direction, the hybrid parallelism techniques can also be used where the bandwidth is the same in both directions of the array.

Figure 1:
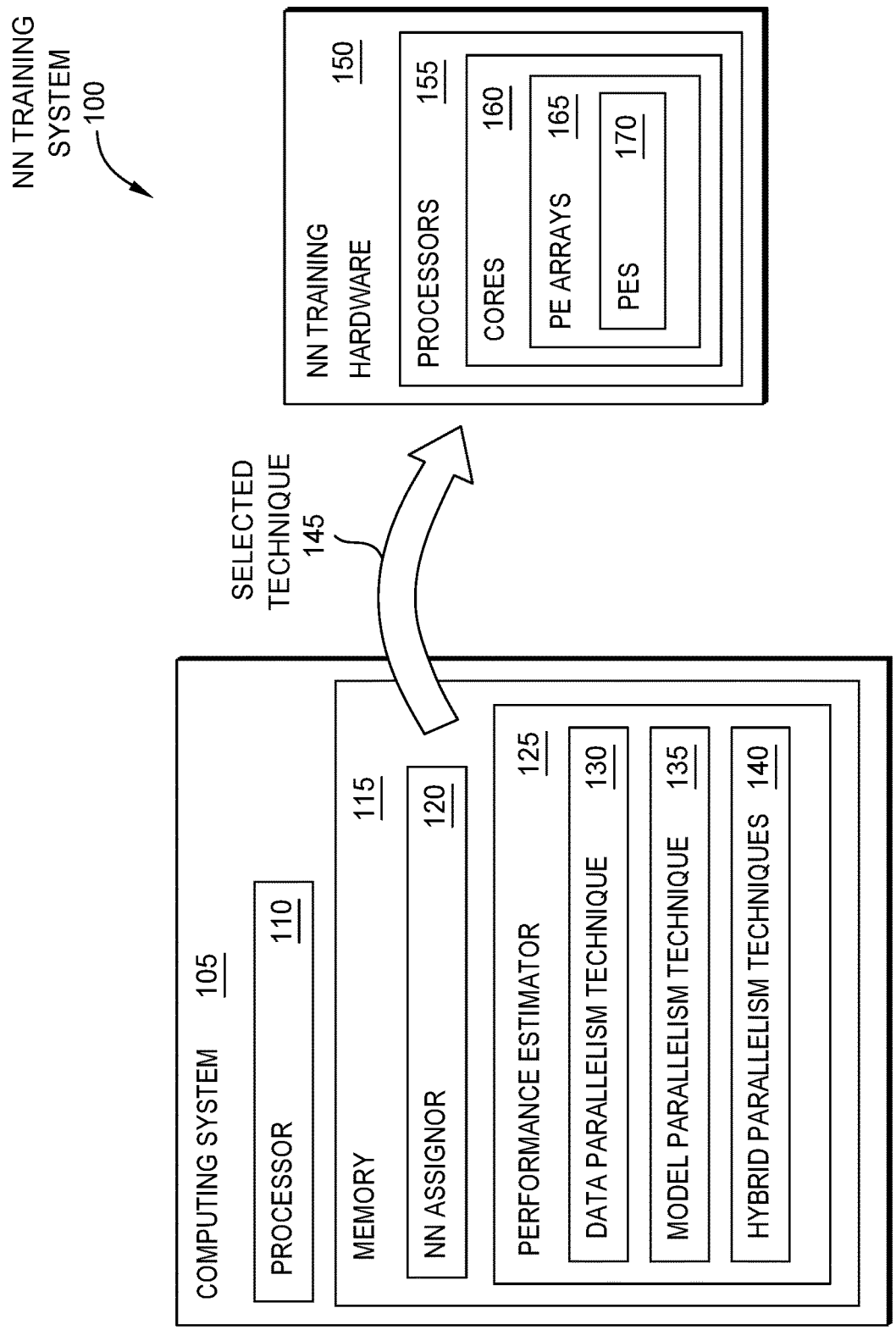
FIG. 1 illustrates a NN training system, according to one embodiment described herein.

FIG. 1 illustrates a NN training system 100, according to one embodiment described herein. The training system 100 includes a computing system 105 that uses a selected technique 145 to split the workload of each layer in a NN assigned to a NN training hardware 150. While the embodiments herein describe splitting the workload of a layer when training the NN, they are limited to such. It may be advantageous to split workload using the techniques discussed below in other situations besides when training the NN.

The computing system 105 includes a processor 110 which represents any number of processing elements with any number of processing cores and memory 115 which can include volatile memory elements, non-volatile memory elements, and combinations thereof. As shown, the memory 115 includes two software applications that execute in the computing system 105: a NN assignor 120 and a performance estimator 125. The NN assignor 120 determines the selected technique 145 that is used to assign the workload of the layers in the NN to the NN training hardware 150. In one embodiment, the NN assignor 120 selects the technique 145 in response to information the performance estimator 125 generates about each layer in the NN. That is, the NN assignor 120 may select a different technique 145 for the various layers in the NN.

The performance estimator 125 models (or simulates) the NN layers to estimate the performance of the layers using a variety of parallelism techniques. In this example, the performance estimator 125 evaluates the layers to determine their performance when using the data parallelism technique 130, the model parallelism technique 135, and one or more hybrid parallelism techniques 140. In one embodiment, the hybrid parallelism techniques 140 are any technique that is a mix of two other parallelism techniques which are used in combination to split a workload of a task among the various hardware elements in the NN training hardware 150. That is, the hybrid parallelism technique 140 can be one or more techniques that are a combination of the data parallelism technique 130 and the model parallelism technique 135. However, the hybrid parallelism technique 140 is not limited to a combination of the techniques 130, 135 but could include a combination of other types of parallelism techniques used to split the workload of a layer among the training hardware 150.

The NN training hardware 150 includes multiple processors 155 that each include multiple cores 160. The cores 160 include multiple processing element (PE) arrays (e.g., systolic arrays) formed using multiple PEs 170. As discussed below, the selected technique 145 splits the workload of a layer between the processors 155. For example, if the data parallelism technique 130 is the selected technique 145, the workload is split by minibatches where each minibatch is assigned to a different processor 155 (e.g., an image used when training an image processing NN is sent to each processor 155). If the model parallelism technique 135 is the selected technique 145, each processor 155 is assigned a subset of the features in the output data (where a subset is one or more). The processors 155 can then operate in parallel to complete their assigned tasks. For example, each processor 155 can simultaneously process an image, or each processor 155 can simultaneously process its assigned subset of features.

Figure 2:
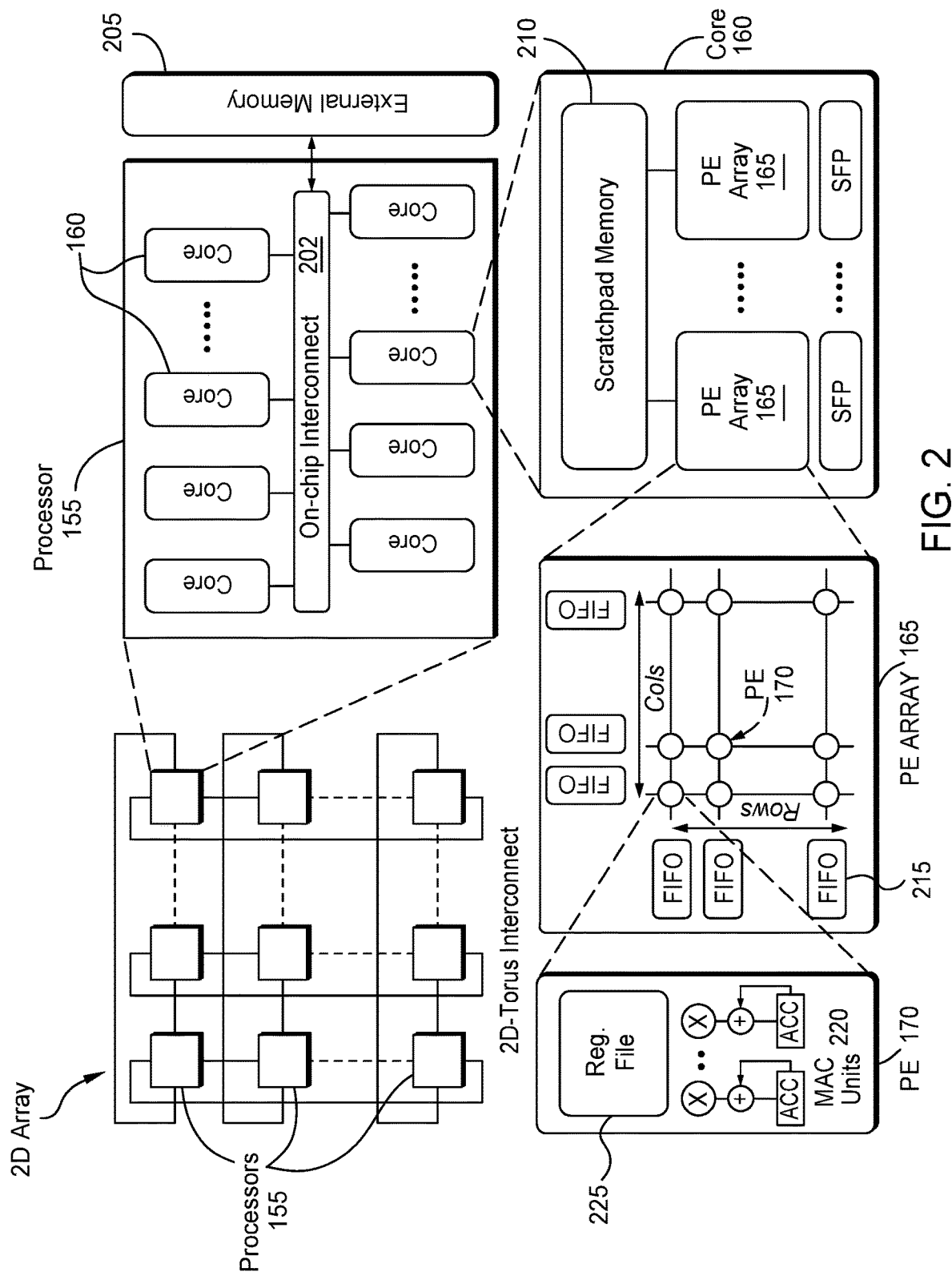
FIG. 2 illustrates NN training hardware, according to one embodiment described herein.

FIG. 2 illustrates NN training hardware, according to one embodiment described herein. FIG. 2 illustrates a 2D array 200 that includes the processors 155 which are interconnected both horizontally (an X direction) and vertically (a Y direction) to neighboring processors 155. As such, the processors can share processed data. This sharing of data is described in more detail below when discussing the hybrid parallelism techniques.

Each processor 155 includes multiple cores 160 that are communicatively coupled using an on-chip interconnect 202 that permits the cores 160 to communicate with external memory 205 (e.g., RAM) in the NN training hardware. In turn, each core 160 includes multiple PE arrays 165 that are coupled to scratchpad memory 210 which represents any number of caches (e.g., level 1 and 2 caches) that form in-chip memory.

Each PE array 165 includes multiple PEs 170 that are interconnected to form an array or grid (e.g., a systolic array). The inputs and outputs of the PE array 165 includes first-in first-out (FIFO) buffers 215. Each PE 170 includes multiply-accumulate (MAC) units 220 coupled to a registry file 225.

The workload of a NN layer can be divided among the various hardware components illustrated in FIG. 2. However, the techniques below focus on splitting the workload of a NN layer among the processors 155. Other techniques can then be used to further split the workload assigned to each processor 155 among the cores 160, the PE arrays 165, and the PEs 170. That is, while the embodiments below discuss selecting an optimal parallelism technique to distribute the workload among the processors 155, the workload can be further split among the hardware elements in the processors 155 using additional parallelism techniques.

Figure 3:
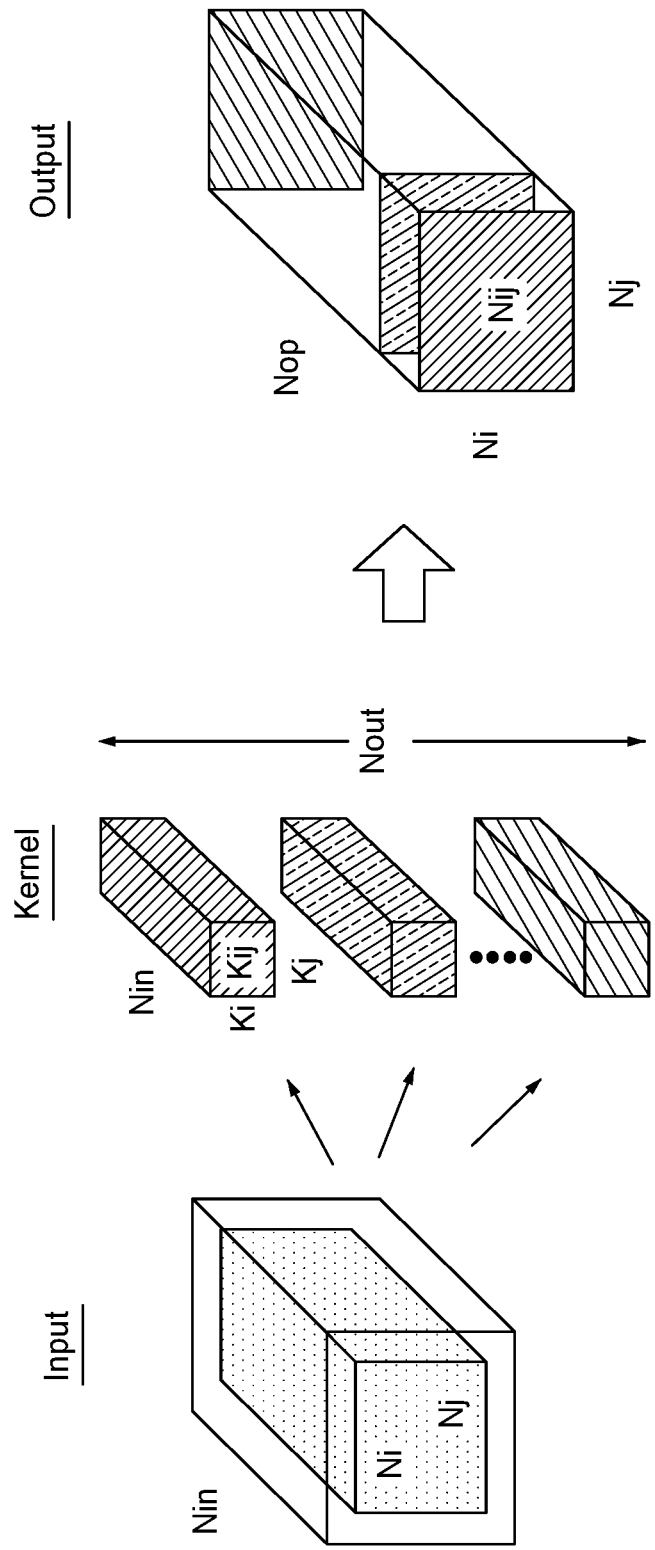
FIG. 3 illustrates various dimensions in a NN, according to one embodiment described herein.

FIG. 3 illustrates various dimensions in a NN, according to one embodiment described herein. That is, FIG. 3 illustrates various dimensions that can be used to partition a convolution layer in a NN. The workload of the convolution layer can input three data structures: input (Inp), output (Out), and weights (kernels). Nin is the number of features (or faces) in the data received from the previous layer or layers in the NN. That is, the input has a depth of Nin. Each feature or face has dimensions expressed by Ni and Nj (e.g., a feature size of Ni×Nj). When performing convolution, each pixel in a feature is processed (e.g., a dot product) using one of the kernels. The NN has Nout number of kernels where each kernel has a height of Ki, width of Kj, and a depth on Nin.

Convolution works by performing the dot product of one of the kernels with a pixel in one of the features in the input. This outputs a scalar value (e.g., a pixel) that is stored in the output. As a result, the depth of the output is Nout (e.g., the number of features in the output) which is the same as the number of kernels. Moving the kernel using a stride when performing the dot product for other pixels in the feature or face of the input results in a feature (or face) of the output. Assuming a stride of 1, the features or faces of the output have the same width and height (Ni and Nj) as the features of the input.

Performing convolution results in four dimensions: Nin, Nij, Kij, and Nout for splitting the workload of the convolution layer. But training a NN also includes minibatches (mb) where a NN can be trained using different input training data (e.g., different training images) that all use the same weights (kernels) to generate multiple output results. Thus, the mb is a fifth dimension that can be used with the other four dimensions to represent the workload of a convolution layer as: N{Inp, Out, Nij, Kij, mb}.

Other types of layers can be expressed using different dimensions. For example, when performing matrix multiplication for fully connected layers in a NN, the Nij and Kij values are 1. In any case, the embodiments herein can be used to divide different types of layers that may have different types (and numbers) of dimensions.

Figure 4:
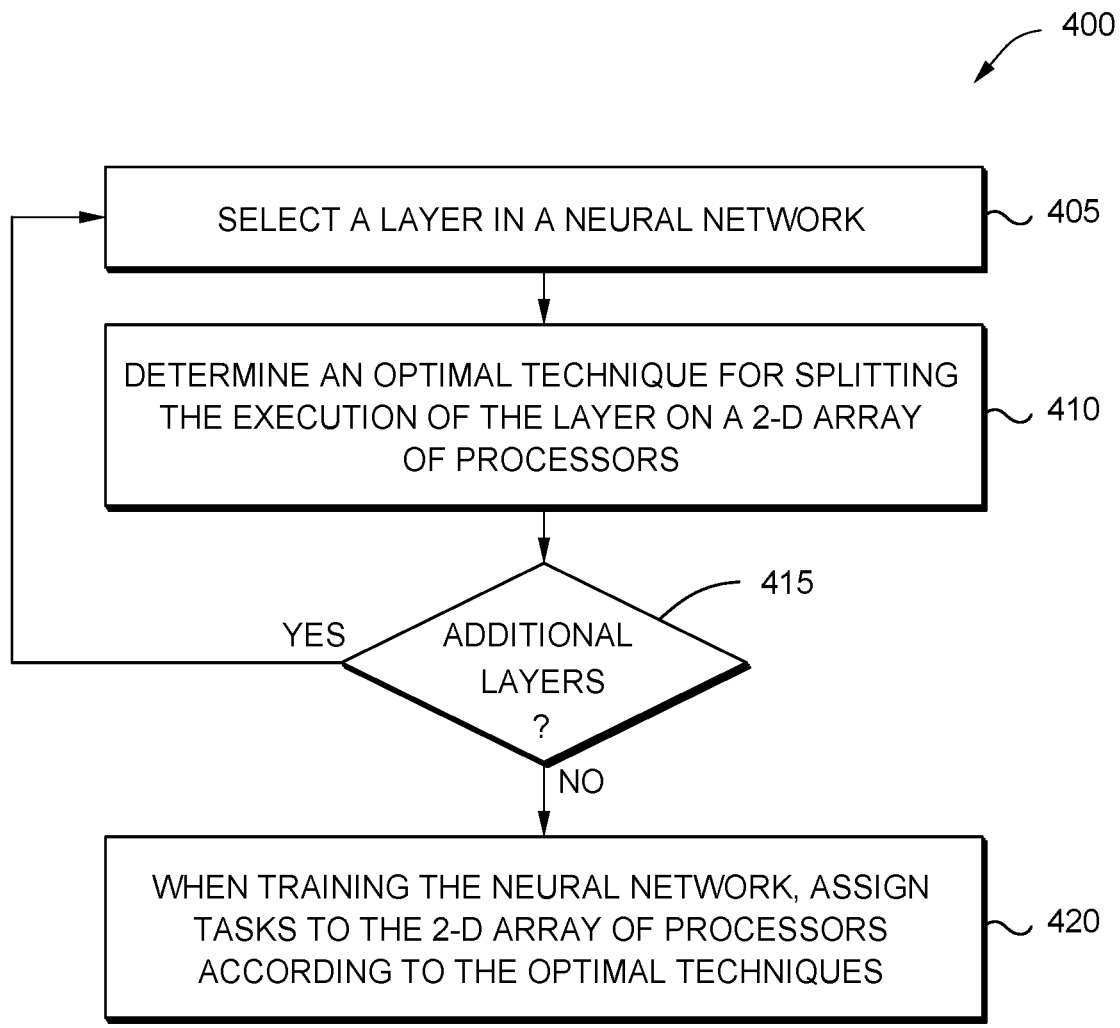
FIG. 4 is a flowchart for determining an optimal technique for splitting execution of NN layers among an array of processors, according to one embodiment described herein.

FIG. 4 is a flowchart of a method 400 for determining an optimal technique for splitting execution of NN layers among an array of processors, according to one embodiment described herein. At block 405, the NN assignor selects a layer in a NN. In one embodiment, the method 400 is used to iterate through each layer in the NN and select an optimal parallelism technique.

At block 410, the NN assignor determines an optimal technique for splitting the execution of the layer on a 2D array of processors. That is, the NN assignor may determine which of the techniques illustrated in FIG. 1 (the data parallelism technique 130, the model parallelism technique 135, or a hybrid parallelism technique 140) is the optimal technique for the particular layer.

In one embodiment, the 2D array of processors is a 2D torus where the processors are interconnected. For example, the processors may be communicatively coupled to neighboring processors in two different directions (e.g., x/y or north/south). In one embodiment, the bandwidth for processor-to-processor communication may be different depending on the direction. For example, the 2D array may be designed such that communication between processors in the X direction has higher bandwidth than communication between processors in the y direction. The details for selecting the optimal technique to use when splitting workload among processors in a 2D array are described in FIG. 5 below.

At block 415, the NN assignor determines whether additional layers are remaining in the NN. That is, the NN assignor determines whether it has selected an optimal parallelism technique for each layer in the NN. If not, the method 400 returns to block 405, but if so, the method proceeds to block 420.

At block 420, when training the NN, the NN assignor assigns tasks to the 2D array of processors according to the optimal techniques. If data parallelism or model parallelism is the selected technique, the processors exchange data in both directions by transmitting data according to these techniques. That is, if data parallelism is selected, the processors exchange weights/kernels in both the X and Y directions of the 2D array (also referred to as gradient direction). If model parallelism is selected, the processors exchange input features along both directions.

However, if a hybrid parallelism technique is selected, the processors exchange data in one direction according to data parallelism and the other direction according to model parallelism. Accordingly, the parallelism technique implemented on the direction of the 2D array with the greater bandwidth has improved performance relative to the technique implemented in the other direction that has less bandwidth. The details of this tradeoff is discussed below.

Figure 5:
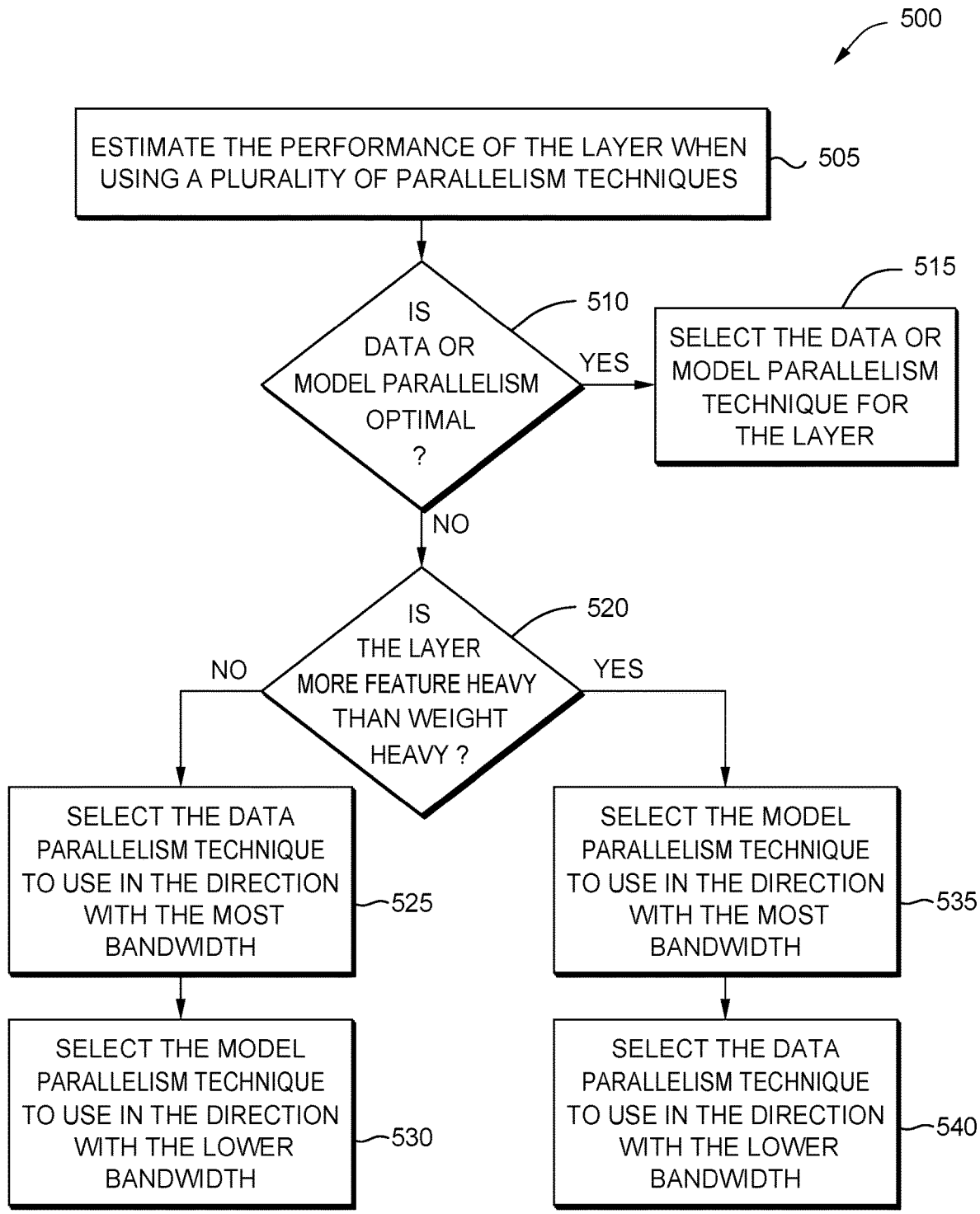
FIG. 5 is a flowchart for selecting a hybrid parallelism technique, according to one embodiment described herein.

FIG. 5 is a flowchart of a method 500 for selecting a hybrid parallelism technique, according to one embodiment described herein. The method 500 describes several techniques for performing block 410 in method 400 to select an optimal parallelism technique for a layer in NN. For clarity, the method 500 is described in parallel with FIG. 6.

At block 505, the performance estimator estimates the performance of the layer when using a plurality of parallelism techniques. For example, at each layer, the performance estimator can use a model or a simulation to estimate how the layer would execute on the NN training hardware using each of the different parallelism techniques, e.g., data parallelism, model parallelism, or hybrid parallelism.

In one embodiment, rather than modeling or simulating each parallelism technique for each layer, the performance estimator may use heuristics to limit the number of techniques that are estimated. For example, the performance estimator may generate a weight-to-feature ratio that can be used to quickly determine what parallelism technique should be used. If the layer has significantly more weight data than feature data according to a predefined threshold, the performance estimator may assume, without performing any further modeling or simulating, that model parallelism is the optimal parallelism technique. Conversely, if the weight-to-feature ratio indicates the layer has significantly more feature data than weight data, data parallelism is deemed the optimal parallelism technique. Thus, the performance estimator does not need to model or test each parallelism technique for each layer.

Figure 6:
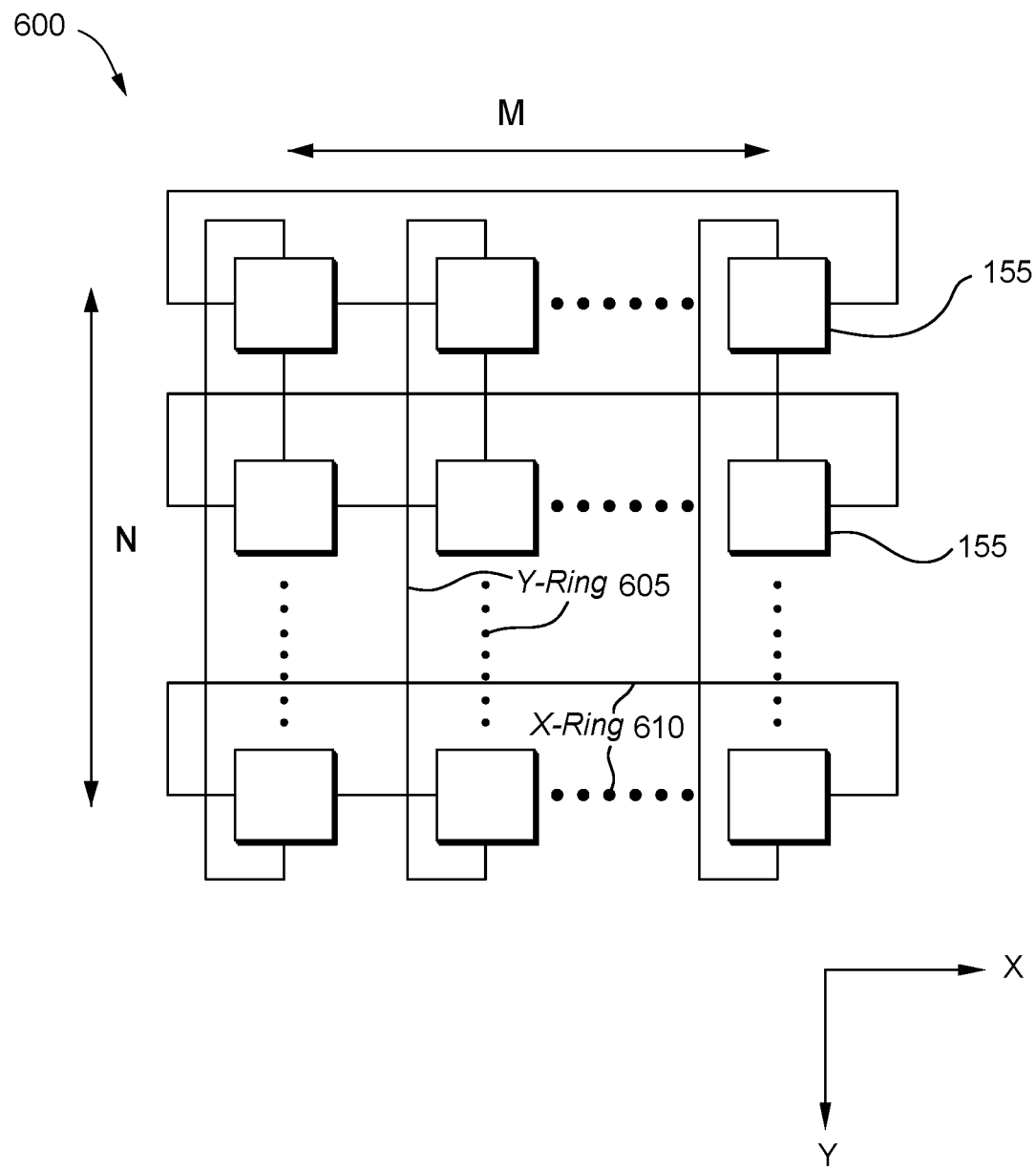
FIG. 6 illustrates an array of processor forming x- and y-rings, according to one embodiment described herein.

As mentioned above, the 2D array of processors can include multiple dimensions where at least one dimension has greater bandwidth for processor-to-processor communication than another dimension. FIG. 6 illustrates an array of processors forming x- and y-rings in a 2D array 600, according to one embodiment described herein. The x-ring 610 indicates communication links processors 155 use to communicate in the X direction while the y-ring 605 indicates communication links processors 155 use to communicate in the Y direction.

In one embodiment, the 2D array 600 may include limited resources for the communication links forming the x- and y-rings. Instead of assigning the same number of resources for both rings, the 2D array 600 has different bandwidth for the x- and y-rings. That is, the 2D array 600 is an asymmetric array (or asymmetric torus) where the bandwidth for processor-to-processor communication is different depending on the direction of data transfer. For example, each processor-to-processor link may include multiple physical connections. To assign more bandwidth to the x-rings 610 than the y-rings 605, the 2D array may have more physical connections assigned to each processor-to-processor link in the X direction than in the processor-to-processor links in the Y direction. As a result, the processors 155 are able to transfer data in the X direction (e.g., to neighboring processors on the left and right) faster than in the Y direction (e.g., to neighboring processors that are above and below). Doing so leverages the hybrid parallelism techniques described herein where the less efficient parallelism technique can be used when transferring data between the processors 155 in the X direction (to take advantage of the greater bandwidth) while the more efficient parallelism technique is used when transferring data between the processors 155 in the Y direction. However, for some NN layers this may not be the case and it is optimal for the more efficient parallelism technique to be used in the direction with the greater bandwidth.

Although FIGS. 2 and 6 illustrate a 2D array of processors, the embodiments are not limited to such. If a NN is implemented using an N dimensional array of processors (where N is greater than 3), at least one of the dimensions (or directions) can be designed to have a greater bandwidth than at least one other dimension. As such, the embodiments described herein can be used to select a hybrid parallelism model where different dimensions use different parallelism techniques.

Returning to method 500, at block 510, the NN assignor determines, using the performance estimates generated at block 505 whether data or model parallelism is the optimal parallelism technique for the layer. If so, the method 500 proceeds to block 515 where the NN assignor assigns the data or model parallelism technique for the layer. That is, when splitting tasks and configuring the NN training hardware, the data is transferred in both directions in the 2D array using the same parallelism technique, whether that is the data model parallelism technique or the model parallelism technique. As such, the same parallelism model is used in both directions, even though one of the directions may have a greater bandwidth than the other direction.

Otherwise, the method 500 proceeds to block 520 where the NN assignor determines, using the performance estimates, whether the layer currently being evaluated is more feature heavy than weight heavy. As mentioned above, in NN layers where the features are larger than the weights (e.g., a heavy layers), the data parallelism technique is more efficient than the model parallelism technique. That is, in some NNs, every output feature requires the entire input channel. That is, to compute a few features, each processor still needs the whole input of the layer (e.g., the output from the previous layer). Using model parallelism, the input is replicated in, or activations are performed on, all the processors. Thus, if the layer is a feature heavy layer, the method 500 proceeds to block 535 where the NN assignor selects the model parallelism technique to use in the direction with the most bandwidth in the 2D array. That way, the negative impact of the activations has less of an effect on the efficient operation of the NN since these activations are transmitted on the processor-to-processor links with the greater bandwidth. At block 540, the NN assignor selects the data parallelism technique to use in the direction with the least amount of bandwidth in the 2D array.

In contrast, if the layer is more of a weight heavy layer, the method proceeds from block 520 to block 525 where the NN assignor selects the data parallelism technique to use in the direction with the most bandwidth in the 2D array and block 530 where the NN assignor selects the model parallelism technique to use in the direction with the least bandwidth. Because data parallelism is used on the links with the greater bandwidth, the negative impact of gradient reduction is reduced. In this manner, the method 500 indicates using two different hybrid parallelism techniques. One hybrid technique is blocks 535 and 540 where model parallelism is used in the higher bandwidth dimension of the array of processors and data parallelism is used in the lower bandwidth dimension and the other is blocks 525 and 530 where data parallelism is used in the higher bandwidth dimension of the array of processors and model parallelism is used in the lower bandwidth dimension.

However, as mentioned above, it may be more efficient to use data parallelism in the direction that has the greater bandwidth for feature-heavy layers or use model parallelism in the direction that has the greater bandwidth for weight-heavy layers. For example, long short-term memory (LSTM) layers, although weight-heavy, prefer hybrid parallelism where model parallelism is used in the direction with the greater bandwidth and data parallelism is used in the direction with the smaller bandwidth. In this case, gradient reduction is quite infrequent (occurs only after all timesteps are complete) and can happen on the slower direction links without impacting performance.

While the method 500 is discussed in the context of an asymmetric array where the bandwidth is different, method 500 can also be used in an symmetric array of processors where the bandwidth in the X and Y directions is the same. For example, the NN training hardware may include more processors than there are minibatches to test. In that case, using only data parallelism is inefficient since the NN assignor can assign a batch (e.g., image) to each processor. In that case, using a hybrid parallelism model can improve efficiency. In another example, the NN assignor may not have enough features to distribute to all the processors (e.g., Nout is less than the number of processors in the array). Thus, using only model parallelism may be inefficient, but splitting the dimensions using a hybrid parallelism model may result in a more efficient use of the NN training hardware. In these examples, it does not matter which parallelism is used in which direction since the directions in an symmetric array have the same bandwidth.

Figures 7, 8:
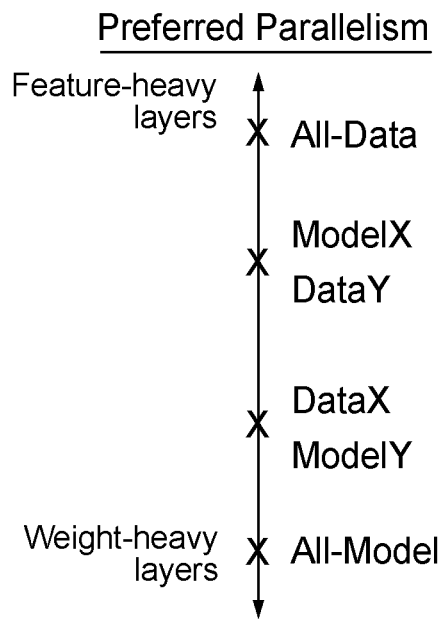
FIG. 7 illustrates a matrix for selecting a parallelism technique for a NN layer, according to one embodiment described herein.
FIG. 8 illustrates a ranking of parallelism techniques based on the characteristics of the NN layer, according to one embodiment described herein.

FIG. 7 illustrates a matrix 700 for selecting a parallelism technique for a NN layer, according to one embodiment described herein. The matrix 700 illustrates four parallelism techniques and their relationships to each other. The x-axis indicates the parallelism technique used in the X direction of the 2D array while the y-axis indicates the parallelism technique used in the Y direction of the 2D array.

The "All-Data" parallelism technique is where only data parallelism is used when splitting the workload. As such, the parallelism in the X direction and the Y direction of the 2D array is performed using data parallelism.

The "DataXModelY" parallelism technique is a first hybrid parallelism technique where data parallelism is used in the X direction of the 2D array but model parallelism is used in the Y direction of the 2D array.

The "ModelXDataY" parallelism technique is a second hybrid parallelism technique where model parallelism is used in the X direction of the 2D array but data parallelism is used in the Y direction of the 2D array.

The "All-Model" parallelism technique is where only model parallelism is used when splitting the workload. As such, the parallelism in the X direction and the Y direction of the 2D array is performed using model parallelism.

FIG. 8 illustrates a ranking of parallelism techniques based on the characteristics of the NN layer, according to one embodiment described herein. The hybrid parallelism techniques represent a tradeoff between the advantages and disadvantages of the data and model parallelism techniques. For NN layers that are primary feature-heavy layers, using the All-Data parallelism technique in both directions of the 2D array will likely lead to the most efficient use of the NN training hardware. Conversely, for NN layers that are primarily weight-heavy layers, using the All-Model parallelism technique in both directions of the 2D array will likely lead to the most efficient use of the NN training hardware.

Using the hybrid parallelism techniques (i.e., the DataXModelY and ModelXDataY) may improve efficiency relative to the All-Data or All-Model techniques for layers that are not primarily feature-heavy or weight-heavy. That is, for layers that fall between these two extremes, it may be more efficient to use a hybrid parallelism technique. That is, for layers that the performance estimator determines are closer to being feature heavy than being weight heavy, the ModelXDataY hybrid parallelism may result in improved efficiency (assuming the X direction of the 2D array has more bandwidth than the Y direction). That is, model parallelism is performed in the X direction while data parallelism is used in the Y direction. Thus, this enables the NN training hardware to mitigate the negative impact of the slower input activations of model parallelism since it is performed in the X direction where bandwidth is the greatest while the inherently more efficient data parallelism is used in the Y direction where the bandwidth is less. For example, convolutional layers with small feature sizes (e.g. final set of convolutional layers in ResNet and GoogLeNet), which are marginally feature-heavy, prefer ModelXDataY parallelism to optimize activation/error rotation.

For NN layers that are closer to being weight heavy than being feature heavy, the DataXModelY hybrid parallelism may result in improved efficiency since data parallelism is performed in the direction with the greater bandwidth (i.e., the X direction) which minimizes the negative impact of weight/gradient reduction while the inherently more efficient model parallelism is performed in the direction with the lower bandwidth. For example, small fully connected layers (e.g., last layers of VGG/ResNet), which are moderately weight-heavy, prefer DataXModelY, for they realize gradient reduction along fast X-direction links.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages presented above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the NN assignor or performance estimator) or related data available in the cloud. For example, the NN assignor or performance estimator could execute on a computing system in the cloud and select the optimal parallelism technique for each layer in a NN. In such a case, the NN assignor or performance estimator could select the optimal techniques and store those selections at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
    selecting, via a computing system, a hybrid parallelism technique for splitting a workload of a neural network layer to an array of processors, wherein each processor in the array of processors can transfer data to neighboring processors in a first direction and a second direction; and
    transferring, via the computing system, the workload to the array of processors based on the selected hybrid parallelism technique, wherein the transferring comprises transferring data between processors in the array of processors in the first direction based on a first parallelism technique of the hybrid parallelism technique, and transferring data between processors in the array of processors in the second direction based on a second parallelism technique of the hybrid parallelism technique, and wherein the workload includes training data used to train a neural network comprising the neural network layer.

2. The method of claim 1, wherein the array of processors has greater bandwidth when transferring data between the processors in the first direction than when transferring data between the processors in the second direction.

3. The method of claim 2, further comprising:
    estimating a performance of the neural network layer using a plurality of different hybrid parallelism techniques; and determining whether the neural network layer is more feature-heavy or weight-heavy based on the estimated performance.

4. The method of claim 3, further comprising:
upon determining the neural network layer is more feature-heavy, using model parallelism as the first parallelism technique and data parallelism as the second parallelism technique.

5. The method of claim 3, further comprising:
upon determining the neural network layer is more weight-heavy, using data parallelism as the first parallelism technique and model parallelism as the second parallelism technique.

6. The method of claim 1, wherein the array of processors forms a 2D torus, wherein the first direction and the second direction are perpendicular.

7. The method of claim 1, further comprising:
estimating a performance of a plurality of layers in the neural network using a plurality of different hybrid parallelism techniques; and
assigning one of the plurality of different hybrid parallelism techniques to each of the plurality of layers.

8. A system, comprising:
an array of processors; and
a neural network assignor configured to:
select a hybrid parallelism technique for splitting a workload of a neural network layer to an array of processors, wherein each processor in the array of processors can transfer data to neighboring processors in a first direction and a second direction; and
transferring the workload to the array of processors based on the selected hybrid parallelism technique, wherein the transferring comprises transferring data between processors in the array of processors in the first direction based on a first parallelism technique of the hybrid parallelism technique, and data is transferred between processors in the array of processors in the second direction based on a second parallelism technique of the hybrid parallelism technique, and wherein the workload includes training data used to train a neural network comprising the neural network layer.

9. The system of claim 8, wherein the array of processors has greater bandwidth when transferring data between the processors in the first direction than when transferring data between the processors in the second direction.

10. The system of claim 9, wherein the neural network assignor is configured to:
estimate a performance of the neural network layer using a plurality of different hybrid parallelism techniques; and
determine whether the neural network layer is more feature-heavy or weight-heavy based on the estimated performance.

11. The system of claim 10, wherein the neural network assignor is configured to:
upon determining the neural network layer is more feature-heavy, use model parallelism as the first parallelism technique and data parallelism as the second parallelism technique.

12. The system of claim 10, wherein the neural network assignor is configured to:
upon determining the neural network layer is more weight-heavy, use data parallelism as the first parallelism technique and model parallelism as the second parallelism technique.

13. The system of claim 8, wherein the array of processors forms a 2D torus, wherein the first direction and the second direction are orthogonal.

14. A computer readable storage medium having computer-readable program code embodied therewith, the computer-readable program code executable by one or more computer processors to perform an operation, the operation comprising:
selecting a hybrid parallelism technique for splitting a workload of a neural network layer to an array of processors, wherein each processor in the array of processors can transfer data to neighboring processors in a first direction and a second direction; and
transferring the workload to the array of processors based on the selected hybrid parallelism technique, wherein the transferring comprises transferring data between processors in the array of processors in the first direction based on a first parallelism technique of the hybrid parallelism technique, and transferring data between processors in the array of processors in the second direction based on a second parallelism technique of the hybrid parallelism technique, and wherein the workload includes training data used to train a neural network comprising the neural network layer.

15. The computer readable storage medium of claim 14, wherein the array of processors has greater bandwidth when transferring data between the processors in the first direction than when transferring data between the processors in the second direction.

16. The computer readable storage medium of claim 15, wherein the operation comprises:
estimating a performance of the neural network layer using a plurality of different hybrid parallelism techniques; and
determining whether the neural network layer is more feature-heavy or weight-heavy based on the estimated performance.

17. The computer readable storage medium of claim 16, wherein the operation comprises:
upon determining the neural network layer is more feature-heavy, using model parallelism as the first parallelism technique and data parallelism as the second parallelism technique.

18. The computer readable storage medium of claim 16, wherein the operation comprises:
upon determining the neural network layer is more weight-heavy, using data parallelism as the first parallelism technique and model parallelism as the second parallelism technique.

19. The computer readable storage medium of claim 14, wherein the array of processors forms a 2D torus, wherein the first direction and the second direction are orthogonal.

* * * * *